July 8, 1930.　　　E. H. LICHTENBERG　　　1,770,175
CUSHIONED POWER TRANSMISSION AND SPEED ACTUATOR
Filed May 18, 1927
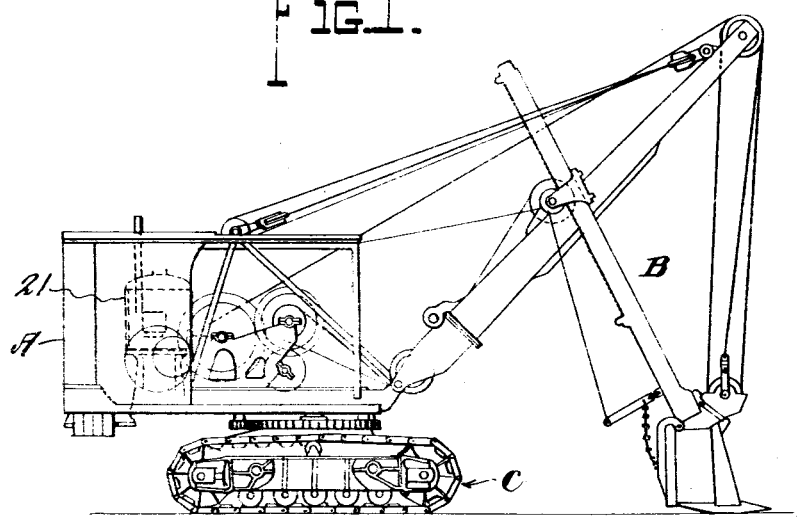
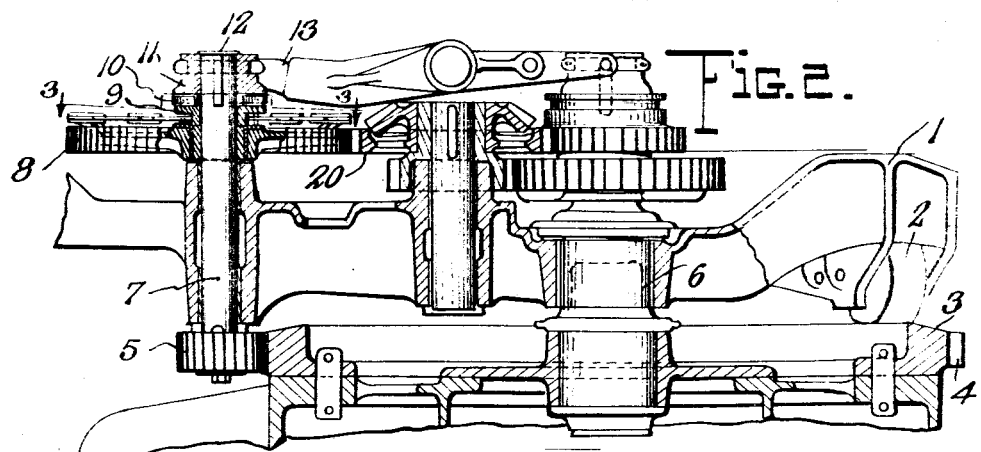
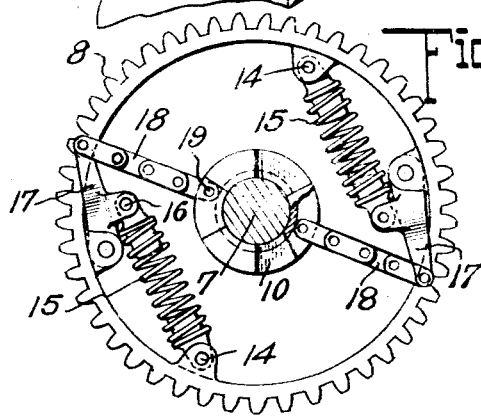
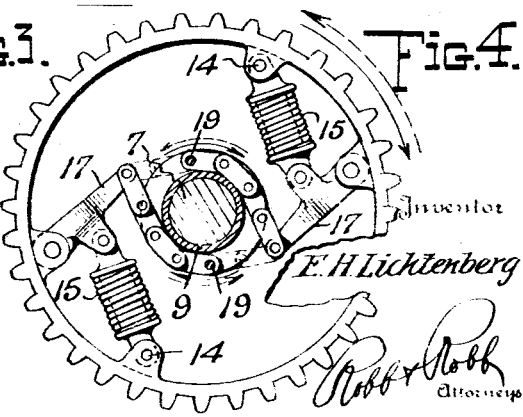
Inventor
E. H. Lichtenberg
Robb & Robb
Attorneys Patented July 8, 1930

1,770,175

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION

CUSHIONED POWER TRANSMISSION AND SPEED ACTUATOR

Application filed May 18, 1927. Serial No. 192,289.

In excavating apparatus, and particularly in shovel construction wherein the shovel body is mounted to swing horizontally and arranged to have its weight counterbalance the weight of the dipper and its carrying and actuating mechanism, it is customary to mount the crane car body on a multiplane or like tractor, or vehicle body, in a manner to allow the crane to swing freely about the king pin connecting the crane body with the tractor, and it is also common to transmit power from the power plant of the crane body through the king pin to the tractor.

In this type of mechanism, it is customary to arrange a turntable or circular platform on the tractor surrounding the king pin and formed with a circular rack engaged by a driving pinion supplied with power from the power plant of the crane and driven for causing the gear to walk about the circular rack and thereby swing the crane car body about the king pin as an axis. Said driving gear is commonly referred to as the swing gear because of its capacity to swing the crane as required, and it is customary to interpose, in the chain of power delivery devices between the engine of the power plant and the swing gear, a clutch which serves as the means of control for delivering power to the swing gear and governing the swinging movements of the crane.

The well known flexibility of steam driven enginery has been ordinarily found sufficient heretofore to allow the said clutch to be thrown into operation without excess strain and with a minimum amount of slipping of the clutch necessary for overcoming the inertia of the crane body, but such flexibility is not always present in power plants having an internal combustion engine as the base of the power unit, so that such power plants require an excessive amount of slipping of the clutch to prevent stalling the engine or starting of the swinging movement with a jerk. The slipping of the clutch at all events is undesirable even with the more flexible types of power sources, and one of the important objects of the present invention is the avoidance of the necessity for such slippage, or the reduction of the necessity to a minimum.

A further object of the invention is the cushioning of the power to be transmitted to the swing gear whereby the minimum amount of sudden starting action and minimum amount of clutch slippage even with power plants of comparatively low flexibility is obtained while at the same time effecting a storing up of power that is permitted to expand itself after the inertia has been overcome and the swinging movement begun, so that a momentum is imparted to the shovel sufficiently to move it at a speed in excess of the actual swinging of the shovel under the direct drive available from the power source. In this way, the speed of swinging of the crane is, by the present invention, substantially, safely, and effectively accelerated, and the time saving element becomes an important factor. By way of comparison, it may be noted that the more flexible power plants without the present invention are capable of swinging a crane say five or six revolutions per minute, where the less flexible power plants are capable of effecting only approximately three or four revolutions per minute. By my invention, even while using the less flexible power plant, a much higher number of revolutions per minute, or a speed in excess of that accomplished, by the more flexible plants, is possible, and this result is obtained without danger, injury or strain to the parts and with the saving incident to avoidance of clutch slippage, either entirely or substantially.

In the accompanying drawing:—

Figure 1 is a view in side elevation of a crane of conventional type embodying the features of the present invention.

Figure 2 is an enlarged, detailed, fragmentary, sectional elevation through the upper turntable, track and rack, and contiguous parts, including the parts embodying the features of the present invention.

Figure 3 is a detailed, sectional plan on an enlarged scale taken approximately on the plane indicated by line 3—3 of Figure 2 and looking downward, the parts being in the at rest position, and a part being broken away to disclose the anchorage of one of the flexible connections.

Figure 4 is a view similar to Figure 3 with the parts in the position at the beginning of the swinging movement and before any of the stored energy has expended itself, the section being taken on a plane similar to that of Figure 3 but sufficiently below to cut beneath the lower clutch member.

In the accompanying drawings, A indicates a crane body carrying the dipper and dipper actuating mechanism B, and mounted as usual on the tractor or other vehicle C. Forming part of the crane body A, is the upper turntable 1 having the rollers 2 resting on the circular platform or track 3, said track being carried by the frame of the tractor C. Outstanding from the perimeter of the track 3 are the gear teeth making up the ring gear or rack 4 with which the swing gear 5 meshes. The turntable 1 is mounted as usual to rotate about the tubular king pin 6 through which extends the power shaft for delivering power to the multiplanes of tractor C, which power shaft receives power through well known gearing, forming no immediate part of the present invention.

Journaled in the turntable 1 is the usual swing gear shaft 7, which carries the gear 5 at its lower end. The upper portion of the shaft 7 extends above the turntable 1 sufficiently to receive a gear 8 which is free to rotate on shaft 7 and meshes with a power delivering gear comprising one of a chain of gears 20 receiving power from the power plant 21 of the crane body A, which may be any of the well known power plants for the purpose, it being understood of course, that the present invention is especially well adapted for cooperation with internal combustion engines but capable for effective action also with any other available source of power. It will be well understood by those familiar with the art, that the chain of gears 20 receiving its power from such enginery receives the same through a friction clutch capable of being slipped for varying the intensity of the pressure of the power delivery. Surrounding the shaft 7, above the gear 8, and likewise rotatable mounted thereon is a sleeve 9 formed with a clutch member 10, upstanding from the upper end of the sleeve. Immediately above the clutch 10 is a cooperating clutch member carried by a sleeve 11 splined at 12 to the swing gear shaft 7. The sleeve 11 is engaged by the shipper arm 13 connected to be shifted by appropriate operating mechanism, such as a lever, not illustrated, located conveniently within the crane body A.

Connected at 14, preferably by a pivot to the peripheral portion of the gear 8, is a spring 15 which spring is also connected at 16, preferably by a pivot, to a lever 17 which lever is pivoted at 18 to a peripheral portion of the gear 8 spaced angularly of the gear from the point of engagement 14. The free end of the lever 17 is engaged by a chain or other flexible connection 18ª which extends to and is pivotally connected at 19 with the sleeve 9. The chain or other flexible connection 18ª is thus located and connected to wrap about the sleeve 9 when gear 8 and sleeve 9 are advanced or either is advanced angularly relative to the other.

While I have described only a single spring 15, as many such springs and their connections may be utilized as available space will permit, two being illustrated in the accompanying drawings as a preferred arrangement, and the same reference numerals being applied to the second as to the first, the same description equally applying.

In operation, the crane body being in a stationary condition, and the clutch member 11 being in engagement with the clutch member 10, power is supplied to the chain of gears 20 and gear 8 is thus advanced angularly in the direction indicated by the full line arrows in Figure 4. Since the inertia of the crane body and its carried parts must be overcome before the swinging begins, the gear 8 will advance angularly about the shaft 7 and relative to the sleeve 9 as far as required to overcome such inertia. In Figure 4, the maximum advance is indicated and it will be observed that when gear 8 has reached this position, the chains 18 will have been wrapped about the sleeve 9 sufficiently for pulling the free ends of the levers 17 inward to substantially the maximum extent of their movement, and thereby compressing the springs 15 and correspondingly storing energy in the springs, or, if the inertia of the crane is overcome earlier, when the power of repression of the springs 15 required for the starting action has been reached, the swing gear 5 begins to rotate, walking on the rack 4 and swinging the crane body.

As the crane body gains momentum, the speed of pinion 5 soon attains that of gear 8, the stored energy in springs 15 adding to the actual driving power received through the chain of gears 20. Such power, however, cannot effectively express itself until the speed of the two gears 5 and 8 become the same. At this point, springs 15 will begin to expand and thereby increase the peripheral speed of gear 8 beyond that effected by the regular delivery of power from the gears 20. Thereby a boost or acceleration is imparted to the rotation of the swing gear 5 and correspondingly to the movement of the crane body A. When this boosting action begins to take place, a percentage of the load or under some circumstances, the entire load, is relieved from the power plant and the crane acquires a speed of rotation exceeding the capacity of the power plant to impart speed of movement to said crane body. When this happens, the fact of such advance of speed of crane body A over its normal movement will be demonstrated by the relaxing of the load from the power plant and the racing of the engine or other familiar behavior of the power source. Thereupon, the operator will swing the shipper arm 13, withdrawing clutch member 11 from clutch member 10, and allowing the crane body to swing under its own momentum. Power is thus saved in the subsequent swinging movement of the car body and time is saved in the speed of such swinging movement. When the crane body has reached the limit of rotation desired, the clutch member 11 is dropped back into mesh with clutch member 10 and in fact this action of the parts may be utilized as a means for placing the chain of gears 20 with the interposed clutch in relation to the swing gear 5 for effecting cessation of the swinging of the crane body beyond the place required. Clutch member 11 should be retained in mesh with clutch member 10 at all times, except when the crane body is allowed to drift under the momentum attained by the boost of the power stored in the springs 15.

Having thus described my invention, what I claim as new and desire to secure by Letters Patent of the United States, is:—

1. In crane construction, the combination, with a swing gear and shaft therefor, of a rotatably mounted wheel, means for rotating said wheel, a spring mounted to be compressed incident to rotation of the wheel, and a flexible connection between the spring and shaft adapted to be wrapped about the shaft on compression of the spring, whereby power is stored in the spring to be subsequently imparted to the shaft thereby increasing the speed of said shaft above the speed imparted thereto by the means for rotating the wheel.

2. In crane construction, the combination, with a swing gear and shaft carrying the same, of a wheel rotatably mounted on the shaft, means for driving said wheel, a sleeve rotatably mounted on the shaft, a clutch for detachably connecting the sleeve to the shaft, a lever pivoted to the wheel, flexible means connecting the free portion of the lever to the sleeve, said flexible means being adapted to be wrapped about the sleeve when the wheel is rotated and thereby swing the said lever on its pivot, and a spring located to be placed under tension by the swinging of said lever.

3. In combination, power means, a gear in driven connection with said power means, lever means on said gear and rotatable means in driven connection with said lever means, said lever means having pivotal connection with said gear and flexible connecting means between said lever and rotatable means adapted to be wrapped around the rotatable means on the application of power to said gear, and means adapted to be placed under tension by said lever in the initial stage of application of power to said gear.

In testimony whereof I affix my signature.

ERICH H. LICHTENBERG.